US006622525B1

(12) United States Patent
Scott et al.

(10) Patent No.: US 6,622,525 B1
(45) Date of Patent: Sep. 23, 2003

(54) APPARATUS FOR DELIVERING A CASED GLASS STREAM

(75) Inventors: Garrett L. Scott, Toledo, OH (US); James E. Fenstermacher, Maumee, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 32 days.

(21) Appl. No.: 09/699,539

(22) Filed: Oct. 30, 2000

Related U.S. Application Data

(62) Division of application No. 09/252,400, filed on Feb. 18, 1999, now Pat. No. 6,176,103, which is a division of application No. 08/903,785, filed on Jul. 31, 1997, now abandoned.

(51) Int. Cl.$^7$ ............................................... C03B 7/084
(52) U.S. Cl. ............................. 65/145; 65/326; 65/329
(58) Field of Search ......................... 65/209, 325, 326, 65/329, 145, 157

(56) References Cited

U.S. PATENT DOCUMENTS

| 1,529,947 A | 3/1925 | Freese |
| 2,021,523 A | 11/1935 | Slick, Jr. |
| 2,093,374 A | 9/1937 | Wadsworth |
| 2,265,414 A | 12/1941 | Beers et al. |
| 2,390,176 A | 12/1945 | Ross |
| 4,023,953 A | 5/1977 | Megles, et al. |
| 4,457,771 A | 7/1984 | Ambrogi |
| 4,717,412 A | 1/1988 | Kulig |
| 4,740,401 A | 4/1988 | Barkhau et al. |

FOREIGN PATENT DOCUMENTS

| DE | 3843425 | 6/1990 |
| EP | 0722907 | 7/1996 |
| EP | 0722908 | 7/1996 |
| EP | 0831067 | 3/1998 |
| GB | 114583 | 4/1918 |

*Primary Examiner*—Sean Vincent

(57) ABSTRACT

Apparatus for forming a cased glass stream having an inner core glass surrounded by an outer casing glass that includes a spout for delivering core glass from a first source through a first orifice. A second orifice is vertically spaced beneath and aligned with the first orifice, and is surrounded by an annular chamber that communicates with the second orifice through a gap between the first and second orifices. A tube delivers casing glass from the outlet opening of a casing glass spout to the annular chamber in such a way that glass flows by gravity through the orifices from the first and second sources to form the cased glass stream. A hollow tube within the casing glass spout is positioned with respect to the spout outlet opening for metering flow of casing glass through the outlet opening and delivery tube to the annular chamber surrounding the orifices. The interior of the hollow tube is coupled to a source of gas under pressure so as to maintain the tube interior, and the interior of the thin fall of casing glass through the spout outlet opening, at a pressure above ambient pressure surrounding the casing glass spout. This elevated gas pressure within the casing glass fall reverses the pressure differential between the interior and exterior of the spout outlet opening, so that any tendency for air to migrate through the refractory material surrounding the outlet opening and into the casing glass fall is eliminated.

8 Claims, 4 Drawing Sheets

APPARATUS FOR DELIVERING A CASED GLASS STREAM

This application is a division of application Ser. No. 09/252,400 filed Feb. 18, 1999 now U.S. Pat. No. 6,176,103, which is a division of application Ser. No. 08/903,785 filed Jul. 31, 1997 and now abandoned.

The present invention is directed to delivery of a glass stream for forming glass charges for glassware manufacture, and more particularly to a method and apparatus for delivering a so-called cased glass stream in which an inner or core glass is surrounded by an outer or casing glass.

BACKGROUND AND OBJECTIVE OF THE INVENTION

It has heretofore been proposed to provide a cased glass stream for forming glassware having layered wall segments. U.S. application Ser. Nos. 08/374,371 and 08/374,372 disclose techniques for delivering such a cased glass stream in which core glass from a first source is delivered through a first orifice. A second orifice is vertically spaced beneath and aligned with the first orifice, and is surrounded by an annular chamber that communicates with the second orifice through a gap between the first and second orifices. A heated tube delivers casing glass from a second glass source to the annular chamber that surrounds the second orifice. Glass flows by gravity through the first and second orifices from the first and second sources in such a way that a cased glass stream emerges from the second orifice. This cased glass stream may be sheared by conventional techniques to form individual cased glass gobs for delivery to conventional individual section glassware forming machines.

Although the techniques disclosed in the noted patent applications address and overcome problems theretofore extant in the art, further improvements remain desirable. For example, the presence of air bubbles, sometimes termed "blisters," in the casing glass stream has been a problem. Flow of casing glass from the casing glass spout is controlled by a spout tube which is positioned over the casing glass spout outlet opening so as to meter casing glass flow at the desired volumetric ratio relative to core glass flow. However, the volumetric ratio of casing glass flow to core glass flow is very low, such as on the order of 5 to 10%. Consequently, when using conventional glassware forming equipment, the extremely low volume of casing glass flowing through the casing glass spout outlet forms a thin fall, around one-quarter inch thick, around the outlet opening and around the upper portion of the heated delivery tube, with the volume within this fall being open. After a period of operation, air bubbles or blisters begin to appear in the casing glass stream. It is believed that a chimney-like effect of the heated air within the interior of the spout outlet opening and the interior of the casing glass delivery control tube creates a pressure differential or gradient between the ambient atmosphere outside of the casing glass spout and the interior within the thin glass fall. It is believed that this pressure gradient promotes migration of air through the refractory material of the casing glass spout, and eventually into the thin glass fall within the spout outlet.

A number of techniques have been proposed in an effort to eliminate this air bubble or blister problem, including lining of the spout outlet opening with platinum in an effort to block air migration. The technique that is currently preferred is periodically to "flood" the casing glass outlet and heated delivery tube with casing glass far in excess of that needed for forming the cased glass stream, and to maintain this excessive casing glass flow for a period of time. It is believed that this "flooding" of the casing glass delivery path eliminates the chimney effect previously described, and further that hydrostatic pressure on the casing glass promotes flow of casing glass into the refractory material of the spout outlet opening so as to block air migration paths. When casing glass flow at reduced level is resumed, the air bubbles or blisters are eliminated for a period of time. However, continued use of the ceramic spout requires that the described "flooding" operation be undertaken with increasing frequency, apparently due to increasing erosion and wear of the spout material. It is believed that, as the refractory spout material ages, it becomes more difficult to fill the air migration cracks and passages within the casing glass spout. In any event, the described "flooding" operation detracts from glass production, and therefore undesirably increases production costs. Furthermore, production of cased glass having air bubbles or blisters in the casing layer results in undesirably increased scrap rates, further increasing production costs.

It is therefore a general object of the present invention to provide a method and apparatus for delivering a glass stream, particularly a cased glass stream, in which formation of air bubbles or blisters in the thin glass fall of the casing glass stream is reduced or eliminated, and in which the need periodically to "flood" the glass stream delivery path is also eliminated. Another and related object of the present invention is to provide a method and apparatus for delivering a glass stream, particularly a cased glass stream, that is characterized by improved production efficiency and therefore reduced manufacturing cost as compared with similar prior art techniques.

SUMMARY OF THE INVENTION

Apparatus for forming a cased glass stream having an inner core glass surrounded by an outer casing glass in accordance with a presently preferred embodiment of the invention includes a spout for delivering core glass from a first source through a first orifice. A second orifice is vertically spaced beneath and aligned with the first orifice, and is surrounded by an annular chamber that communicates with the second orifice through a gap between the first and second orifices. A tube delivers casing glass to the annular chamber from the outlet opening of a casing glass spout in such a way that glass continuously flows by gravity through the orifices from the first and second sources to form the cased glass stream. A hollow spout tube within the casing glass spout is positioned with respect to the spout outlet opening for metering flow of casing glass through the outlet opening and delivery tube to the annular chamber surrounding the orifices. The interior of this spout tube is coupled to a source of gas under pressure so as to maintain the tube interior and the interior of the thin fall of casing glass through the spout outlet opening at a pressure above ambient pressure surrounding the easing glass spout. This elevated gas pressure within the casing glass fall reverses the pressure differential between the interior and exterior of the spout outlet opening, so that any tendency for air to migrate through the refractory material surrounding the outlet opening and into the casing glass fall is eliminated.

In accordance with another aspect of the present invention, there is provided an apparatus for delivering a glass stream that includes a glass spout having a lower outlet opening and a flow control spout tube disclosed within the spout. The spout tube has a closed upper end, a hollow interior and an open lower end adjacent to the spout outlet opening, and position of the tube within the spout is controlled so as to control flow of glass through the outlet opening. The hollow interior of the flow control tube is coupled to a source of gas under pressure so as to maintain the tube interior at a pressure above that of ambient air surrounding the spout. Thus, a third aspect of the invention contemplates a method of preventing permeation of air through the refractory material around the spout outlet opening into the glass flowing through the outlet opening by delivering gas under pressure to the flow control tube so as to maintain gas pressure within the tube and within the spout outlet opening above ambient air pressure around the spout. By way of example, gas pressure within the flow control tube and the spout outlet opening may be maintained at a pressure of about two inches of water column above ambient. The gas maintained under pressure within the spout tube may comprise air, nitrogen or argon. In some applications, such as manufacture of amber glass, it may be desirable to provide a reducing gas within the spout tube and in contact with the glass flow, which would thus advantageously change the nature of the atmosphere in contact with the glass flow. For example, methane or another combustible gas may be injected into the spout tube to burn and maintain a reducing atmosphere at elevated pressure in contact with the glass flow.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
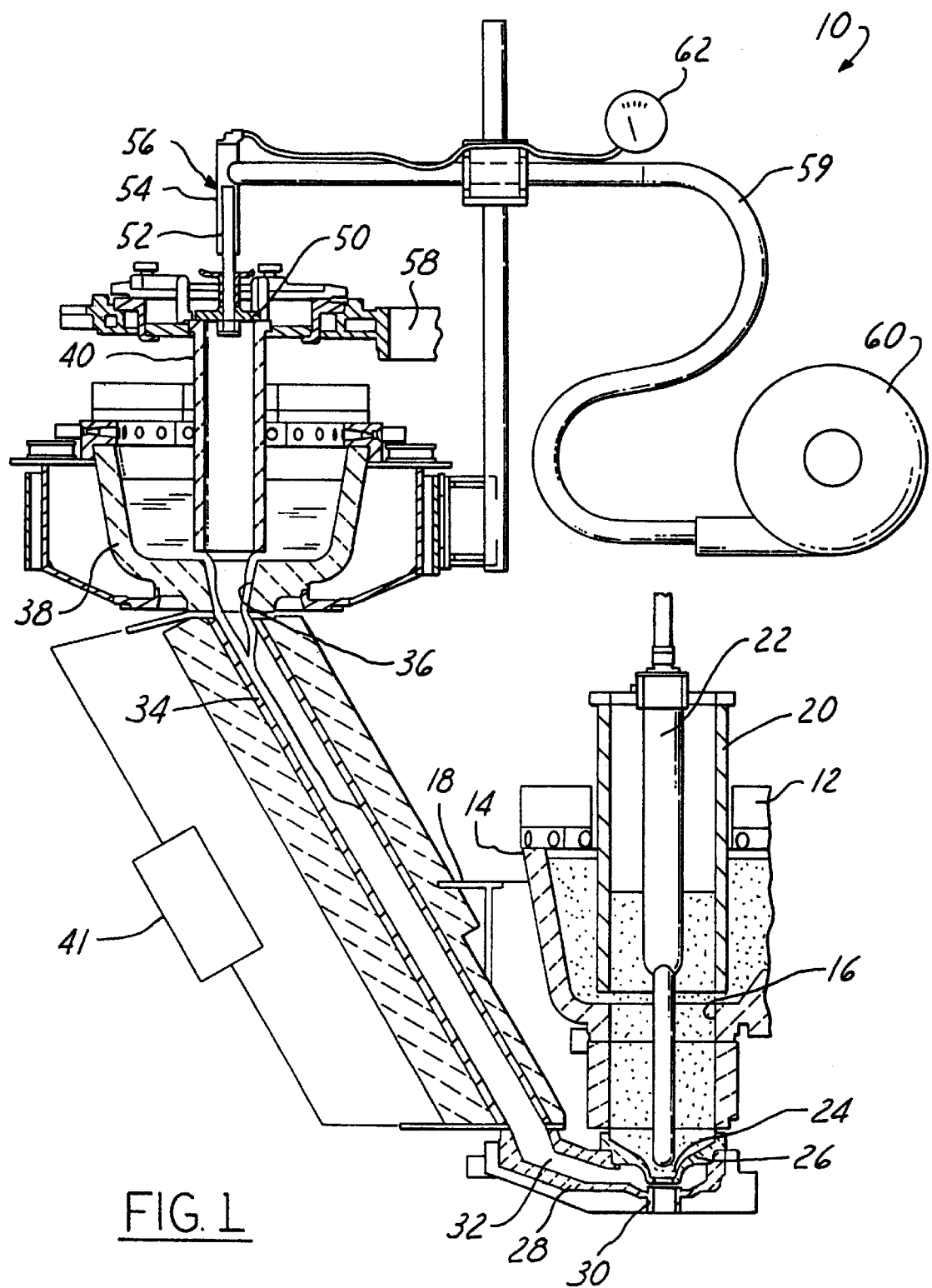
FIG. 1 is a fragmentary elevational schematic diagram of a glass delivery system in accordance with a presently preferred embodiment of the invention.

The drawings illustrate a system 10 for delivering a stream of cased glass. A first forehearth 12 delivers core glass to a bowl or spout 14 that has an opening 16 at the lower end thereof. Spout 14 is surrounded by a protective casing 18, preferably constructed of non-magnetic material such as stainless steel. A spout tube 20 and a plunger 22 control delivery of core glass from spout 14 through opening 16 to and through one or more first orifices 24 carried by an upper orifice ring 26 beneath spout 14. A lower orifice ring 28 carries one or more second orifices 30 positioned beneath orifices 24 and axially aligned therewith. Orifice(s) 30 is surrounded by an annular chamber 32 formed between orifice rings 26, 28. Chamber 32 communicates with orifice(s) 30 by means of a lateral space or gap between orifices 24, 30. Annular chamber 32 is coupled by a delivery tube 34 to the opening 36 at the lower end of a casing glass spout 38. Spout 38 includes a delivery control spout tube 40, and is coupled to a casing glass forehearth. Delivery tube 34 is resistance-heated by control electronics 41 for maintaining flow of casing glass to chamber 32. To the extent thus far described, system 10 is essentially the same as disclosed in above-noted U.S. application Ser. Nos. 08/374,371 and 08/374,372. The former such application is directed in particular to construction of casing glass delivery tube 34, while the latter of such applications is directed in particular to construction of orifice rings 24, 26. The disclosures of such applications, both of which are assigned to the assignee hereof, are incorporated herein by reference for purposes of background.

Figure 2:
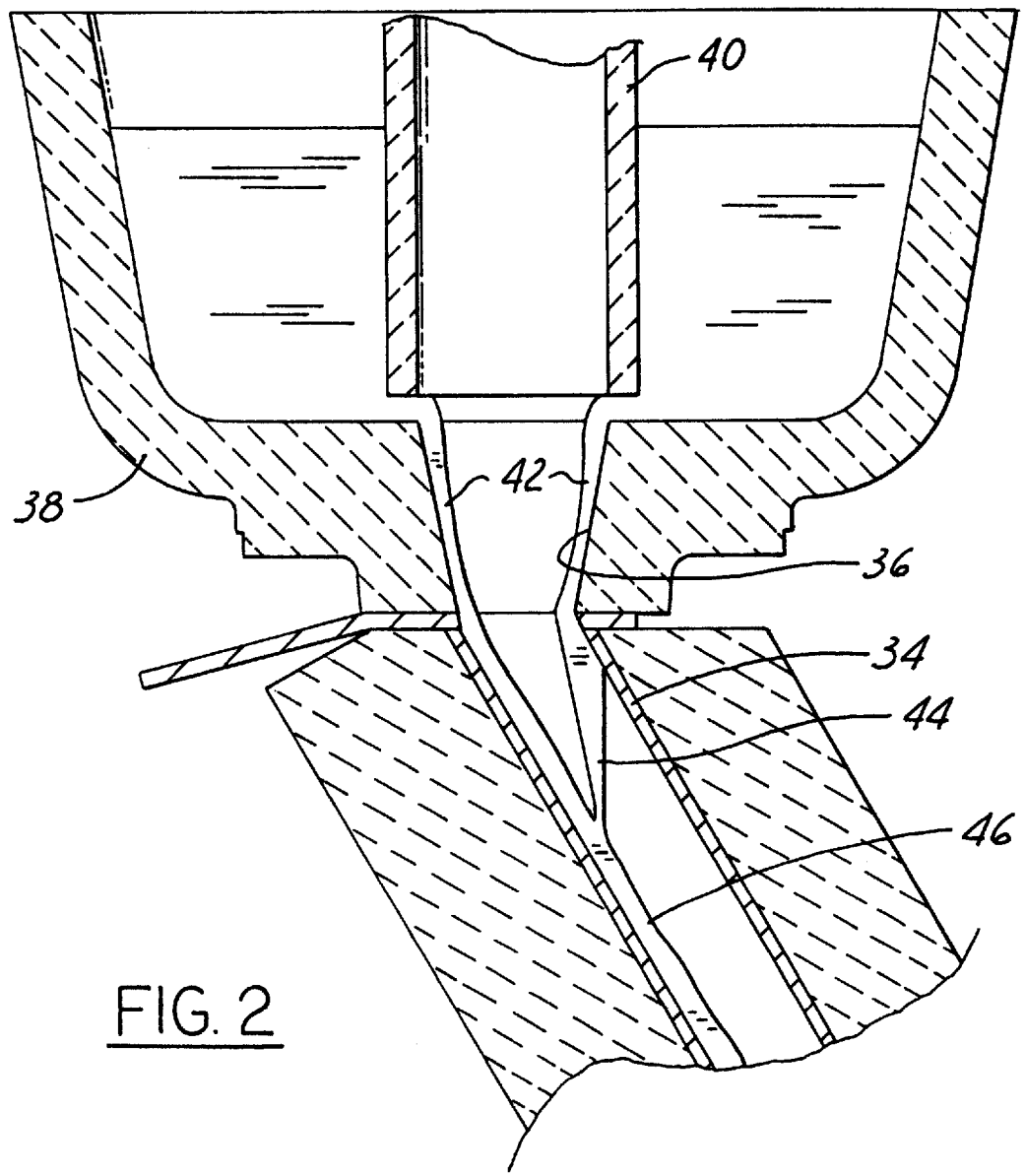
FIG. 2 is a fragmentary sectional view on an enlarged scale of a portion of the delivery system illustrated in FIG. 1.

A characteristic of cased glass stream delivery systems is that the volumetric ratio of casing glass to core glass is extremely low, which is to say that the quantity of casing glass needed per unit volume of core glass is extremely low. Consequently, casing glass flow rate is extremely low, and does not fill the volume of either delivery tube 34 or spout outlet opening 36. As shown in greater detail in FIG. 2, the low volumetric flow rate of casing glass is such that the glass that continuously flows beneath the lower open end of spout tube 40 through spout outlet opening 36 and into the upper end of delivery tube 34 forms a thin wall or fall around the conical interior of opening 36 into the interior of tube 34. In current systems for commercial production of casing glass, this thin layer or fall of casing glass 42 around the interior of the conical interior of outlet opening 36 is around one-quarter inch thick. This thin fall continues into tube 34, which is disposed at an angle to the axis of opening 36. The glass that initially tends to flow along the upper surface of tube 34 eventually breaks away from the tube surface, forming a fall 44 that merges into a thin flow 46 that flows along the angulated lower surface of tube 34. The flows 42, 44, 46 are continuous, smooth and laminar, and do not fold upon themselves which would tend to trap air bubbles. Consequently, it is believed that a "chimney effect," caused by the heated air within tube 40, glass fall 42 and glass falls 44, 46, creates a pressure gradient or differential with respect to the external atmosphere, which promotes migration of air through the refractory material of spout 38 surrounding outlet opening 36. This air migration eventually reaches the interior of the refractory material, and results in bubbles or blisters within fall 42.

To overcome this effect, the present invention contemplates that a source of gas under pressure be coupled to the open interior of spout tube 40, outlet opening 36 and tube 34. Specifically, a cap 50 is placed over the upper end of tube 40. A hollow tube 52 extends upwardly from cap 40, and is surrounded at its upper end by a tube 54 of larger diameter. Thus, tubes 52, 54 effectively form a rotary union 56 that permits both rotation of tube 40, and vertical motion of tube 40 by means of bracket 58 for controlling the flow-metering gap between the open lower end of tube 40 and the upper end of outlet opening 36. Rotary union 56 is coupled by a conduit 59 to a blower 60, which continuously supplies gas under pressure (ambient air in this embodiment) through conduit 59 and union 56 to the hollow interior of tube 40. A gauge 62 is coupled to union 56 for monitoring air pressure within tube 40. An air deflector 64 is externally positioned around tube 52 beneath union 56 to prevent direct impingement of air upon cap 50, which would unduly cool the glass within spout 38.

The presence of gas under pressure within tube 40 and outlet opening 36 splits fall 44 (FIG. 2) and fills the upper interior of tube 34 with air. However, because tube 34 is of metal composition, preferably platinum, migration of air through the ceramic insulating material surrounding tube 34 is not a problem. Rather, it is the elevated air pressure within outlet opening 36 that effectively cancels the "chimney effect" formerly extant, and reverses the pressure differential or gradient across the ceramic material surrounding the spout outlet. Creation of air bubbles or blisters within the casing glass material is substantially eliminated. It has been found that gas pressure within tube 40 and outlet opening 36 in the range of about 0.05 to 10 inches of water column above ambient air pressure, and most preferably about two inches of water column above ambient air pressure, yields satisfactory results.

Figure 3:
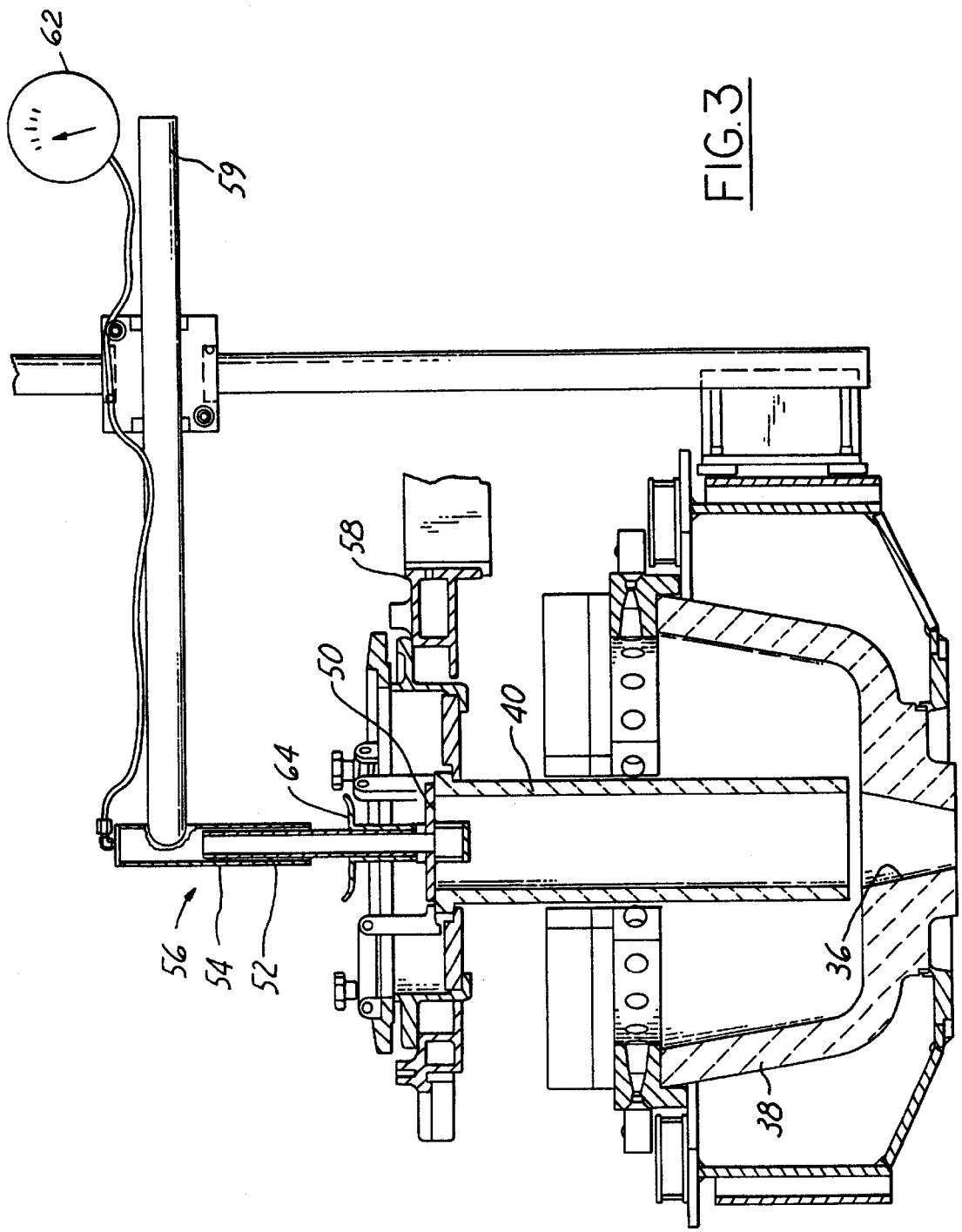
FIG. 3 is a fragmentary sectional view on an enlarged scale of another portion of the glass delivery system illustrated in FIG. 1.
Figure 4:
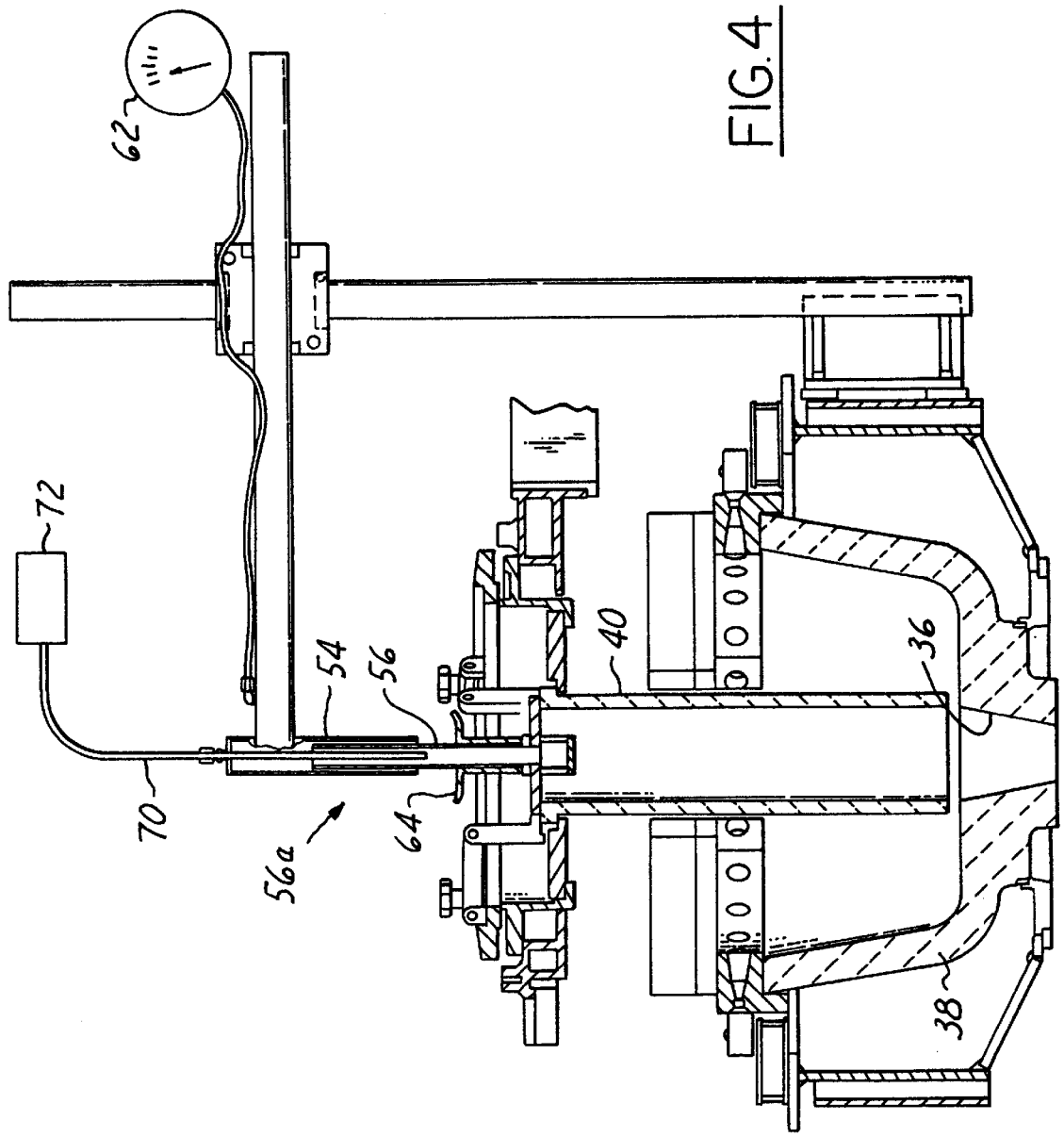
FIG. 4 is a sectional view similar to that of FIG. 3 but showing a modified embodiment of the invention.

As noted above, FIGS. 1–3 illustrate a presently preferred embodiment in which the injected gas is air. However, other gases may be employed for obtaining other desirable effects. FIG. 4 illustrates a system in which the rotary union 56a includes a tube 70 for connecting an external gas source 72 to the interior of tube 56. The gas from source 72 may comprise nitrogen or argon, for example. In the manufacture of amber glass, for example, it would be desirable to maintain a reducing or oxygen-lean atmosphere within spout tube 40 in contact with the glass fall to prevent oxidation of the glass. For this purpose, gas source 72 may comprise a source of methane or other combustible gas. Combustion of such gas within the upper volume of tube 40 will produce the desired reducing atmosphere while maintaining elevated pressure to avoid gas migration through the spout material.

What is claimed is:

1. Apparatus for forming a cased glass stream having an inner core glass surrounded by an outer casing glass, said apparatus including:
    a core glass source for delivering core glass through a first orifice,
    a housing forming a second orifice vertically spaced beneath and aligned with said first orifice with a chamber surrounding said second orifice and communicating with said second orifice through a gap between said first and second orifices,
    a casing glass source for delivering casing glass to said chamber, such that glass flows by gravity from said sources through said orifices to form said cased glass stream,
    said casing glass source including a spout having an outlet opening and a spout tube disposed within said spout for controlling delivery of casing glass through said spout opening, and
    a source of gas at continuous elevated pressure coupled to said interior volume of said tube, and through said tube to said opening, continuously maintaining said interior volume of said tube at a pressure above ambient pressure surrounding said spout.

2. The apparatus set forth in claim 1 wherein said casing glass source further comprises a heated delivery tube extending from said spout outlet opening to said chamber, said spout tube being positioned with respect to said opening so that glass exiting said opening and entering said heated delivery tube forms a thin fall of glass extending along the interior wall of said outlet opening and said heated delivery tube, the interior of said flow being pressured by gas in said spout tube.

3. The apparatus set forth in claim 1 wherein said spout tube has a closed upper end and an open lower end disposed above said outlet opening, and further comprising a rotary union connecting said source to said closed upper end of said spout tube.

4. The apparatus set forth in claim 1 wherein said gas source comprises a source of air at continuous elevated pressure.

5. The apparatus set forth in claim 1 further comprising a rotary union connecting said source to an upper end of said spout tube.

6. The apparatus set forth in claim 5 wherein said gas comprises a combustible gas that burns within said apparatus to maintain a reducing atmosphere at elevated pressure within said tube.

7. The apparatus set forth in claim 1 wherein said gas within said tube is at a continuous elevated pressure in the range of about 0.05 to 10 inches of water column.

8. The apparatus set forth in claim 7 wherein said pressure is about two inches of water column.

* * * * *